US011025146B2

(12) United States Patent
Shi et al.

(10) Patent No.: US 11,025,146 B2
(45) Date of Patent: Jun. 1, 2021

(54) LINEAR VIBRATION MOTOR HAVING ELASTIC PIECES PROVIDED WITH VIBRATION ARMS

(71) Applicant: GOERTEK INC., Shandong (CN)

(72) Inventors: Hua Shi, Shandong (CN); Hongchao Sun, Shandong (CN)

(73) Assignee: GOERTEK INC., Shandong (CN)

( * ) Notice: Subject to any disclaimer, the term of this patent is extended or adjusted under 35 U.S.C. 154(b) by 222 days.

(21) Appl. No.: 16/307,619

(22) PCT Filed: Dec. 29, 2016

(86) PCT No.: PCT/CN2016/113024
§ 371 (c)(1),
(2) Date: Dec. 6, 2018

(87) PCT Pub. No.: WO2017/211070
PCT Pub. Date: Dec. 14, 2017

(65) Prior Publication Data
US 2020/0313530 A1    Oct. 1, 2020

(30) Foreign Application Priority Data

Jun. 6, 2016  (CN) .......................... 201610401954.2

(51) Int. Cl.
*H02K 33/02* (2006.01)
*H02K 33/00* (2006.01)
(Continued)

(52) U.S. Cl.
CPC ............. *H02K 33/02* (2013.01); *H02K 33/00* (2013.01); *B06B 1/045* (2013.01); *H02K 7/065* (2013.01); *H02K 33/16* (2013.01); *H02K 33/18* (2013.01)

(58) Field of Classification Search
CPC ........ H02K 7/065; H02K 33/00; H02K 33/02; H02K 33/16; H02K 33/18; B06B 1/045
(Continued)

(56) References Cited

U.S. PATENT DOCUMENTS

2018/0248457 A1* 8/2018 Shi ............................ F16F 1/36
2018/0297067 A1* 10/2018 Huang ................... H02K 33/02
(Continued)

FOREIGN PATENT DOCUMENTS

CN         203368282 U    12/2013
CN         204886633 U    12/2015
(Continued)

OTHER PUBLICATIONS

International Search Report from International Application No. PCT/CN2016/113024 dated Feb. 24, 2017.

*Primary Examiner* — Tulsidas C Patel
*Assistant Examiner* — Rashad H Johnson
(74) *Attorney, Agent, or Firm* — Brundidge & Stanger, P.C.

(57) ABSTRACT

A linear vibration motor having elastic pieces provided with vibration arms comprises housing, a mass block, and elastic pieces. The elastic pieces connect the mass block and the housing to provide an elastic force in Z axis direction such that the mass block performs a movement up and down. The elastic pieces are provided with two vibration arms, and the two vibration arms are symmetrical about the X axis when rotating 180 degrees around the X axis. The elastic pieces are S-shaped or inverted Z-shaped, or formed by the combination of two V-shaped vibration arms. The elastic pieces have two or four elastic pieces, and disposed on symmetrical two sides of the mass block.

10 Claims, 4 Drawing Sheets

(51) Int. Cl.
*B06B 1/04* (2006.01)
*H02K 33/16* (2006.01)
*H02K 33/18* (2006.01)
*H02K 7/065* (2006.01)

(58) Field of Classification Search
USPC .............................. 310/12.14, 15, 25, 26, 29
See application file for complete search history.

(56) References Cited

U.S. PATENT DOCUMENTS

2020/0044545 A1* 2/2020 Tang ..................... H02K 33/18
2020/0212785 A1* 7/2020 Cui ........................ H02K 33/16

FOREIGN PATENT DOCUMENTS

| CN | 204886637 U | 12/2015 |
| CN | 204906152 U | 12/2015 |
| CN | 105226908 A | 1/2016 |
| CN | 106026603 A | 10/2016 |
| WO | 2010/147284 A1 | 12/2010 |

\* cited by examiner

LINEAR VIBRATION MOTOR HAVING ELASTIC PIECES PROVIDED WITH VIBRATION ARMS

TECHNICAL FIELD OF THE INVENTION

The present invention relates to a linear vibration motor having elastic pieces provided with vibration arms, and more particularly to a elastic piece for a linear vibration motor.

BACKGROUND OF THE INVENTION

In prior art, the Z axis linear vibration motor comprises an upper shell and a lower shell, and the enclosed space composed of the upper shell and the lower shell comprises a vibration system, an FPCB and a coil; the vibration system is composed of a spiral elastic piece, a permanent magnet, and a mass block. The bottom end of the spiral elastic piece with a larger diameter is fixed to the housing, and the mass block is fixedly connected to the top end of the spiral elastic piece with a smaller diameter. Under the action of the magnetic force of the coil and the permanent magnet, the permanent magnet drives the mass block to reciprocate up and down in the Z axis, at the meanwhile the spiral elastic piece generates a movement of repeatedly stretching and compressing.

In the structure of the conventional Z axis linear vibration motor, the bottom end of the spiral elastic piece with a larger diameter is fixed to the lower shell, and the elastic support member is fixed to the lower shell as disclosed in the Chinese invention patent "Vibration Motor" (Application No.: 201610108737.4).

In the structure of other Z axis linear vibration motor, the spiral elastic piece is inverted, and the bottom end with a larger diameter is fixed to the upper shell, and the elastic piece is fixed to the top wall of the upper shell as disclosed in the Chinese invention patent "A Linear Vibration Motor And Mobile Apparatus" (Application No.: 201510885265.9).

In the ideal state, the spiral elastic piece generates the action of stretching and compressing up and down only in the Z axis. However, since the two ends of the spiral elastic piece have different diameters, and the first order vibration frequency is close to the second order vibration frequency, therefore the existing vibration system is prone to generate polarization when it vibrates. The first order vibration frequency indicates the vibration frequency in the Z axis direction, and the second order vibration frequency indicates the vibration frequency in the X axis direction and the Y axis direction.

In order to eliminate this phenomenon, the following method can be adopt, i.e., increasing the diameter of the top end of the spiral elastic piece such that the diameters of the two ends of the spiral elastic piece are close to each other. The closer the diameters of the two ends of the spiral elastic piece, the less significant the polarization phenomenon, however at the meanwhile the rigidity of the spiral elastic piece is also enhanced, and the vibration frequency and amplitude of the vibrating system are reduced, as a result, the power of the vibration motor is reduced.

SUMMARY OF THE INVENTION

In view of the above problems, the present invention provides a linear vibration motor to solve the problem that the Z axis linear vibration motor in the prior art is prone to generate polarization.

In order to achieve the above purpose, the technical solution of the present invention is achieved as follows:

The present invention provides a linear vibration motor comprising a housing, a mass block, and elastic pieces connecting the mass block and the housing, wherein the elastic pieces have at least two elastic pieces which are respectively arranged on symmetric two sides of the mass block, and the elastic pieces provide an elastic force in Z axis direction, and the mass block performs a movement up and down in the Z axis direction.

The sides of the mass block are provided with support plates, and the central portions of the support plates are provided with a notch penetrating through the support plate in vertical direction.

The elastic pieces are provided with an upper vibration arm and a lower vibration arm, and the two vibration arms are symmetrical about the X axis when rotating 180 degrees around the X axis, and the middle portions of the elastic pieces are fixed in the notch, and the two vibration arms of the elastic piece are respectively located on an upper side and a lower side of the support plates.

Optionally, the linear vibration motor further comprises a stopper which is embedded in the notch, and a middle portion of the elastic pieces and the stopper are welded and fixed into the notch.

Optionally, the support plates comprise two support plates, and the two support plates are disposed on symmetrical two sides of the mass block respectively, or the support plates comprise four support plates, and the four support plates are arranged on four sides of the mass block respectively, and the elastic pieces comprise two or four elastic pieces corresponding to the support plates.

The elastic pieces disposed on two sides of the mass block are symmetrical about the Z axis when rotating 180 degrees around the Z axis.

Optionally, the elastic pieces are S-shaped elastic pieces.

The middle portions of the S-shaped elastic pieces are welded and fixed in the notch of the support plates, and the S-shaped elastic pieces are provided with two vibration arms which are respectively located on the upper side and lower side of the support plate. The free ends of the two vibration arms are provided with welding planes, and the two vibration arms are respectively welded and fixed in the housing by welding the welding planes.

Optionally, the length of the S-shaped elastic piece is greater than the length of the support plate.

Optionally, the elastic pieces are composed of two V-shaped vibration arms and one connecting piece, and the V-shaped vibration arms are integrally formed with the connecting piece. The two V-shaped vibration arms are symmetrical about the Z axis when rotating 180 degrees around the X axis, and the openings of the two V-shaped vibration arms are opposite to each other.

The connecting piece is fixed in the notch, and the two V-shaped vibration arms are respectively located on the upper side and the lower side of the support plates. The free ends of the two V-shaped vibration arms are provided with welding planes, and the two vibration arms are respectively welded and fixed in the housing by welding the welding planes.

Optionally, the length of the V-shaped vibration arms is not greater than ½ of the length of the support plates.

Optionally, the elastic pieces are anti-Z-shaped elastic pieces.

The middle portions of the anti-Z-shaped elastic pieces are welded and fixed in the notch of the support plate, and the anti-Z-shaped elastic pieces are provided with two vibration arms, and the two vibration arms are respectively located on the upper side and lower side of the support plate. The free ends of the two vibration arms are provided with welding planes, and the two vibration arms are respectively welded and fixed in the housing by welding the welding planes.

Optionally, the length of the anti-Z-shaped elastic piece is not greater than the length of the support plate.

Optionally, the elastic piece is made of a single material or a composite material, or the material in which a composite layer is added at later stage of the processing.

The linear vibration motor having the above-described structure has the following advantages:

In the present invention, the elastic pieces are distributed and oppositely arranged on two sides of the mass block, and each side of the elastic pieces is provided with a vibration arm on the upper side and the lower side. This structure can effectively increase the difference between the first order vibration frequency and the second order vibration frequency of the vibration system, and effectively prevent the generation of polarization.

In the present invention, the elastic pieces are welded in the state of penetrating through the mass block, so that can also function to prevent the generation of polarization.

In the present invention, the elastic piece are welded in the state of penetrating through the mass block, and the welding method greatly simplifies the process, which is advantageous for reducing the cost and increasing the yield.

DETAILED DESCRIPTION OF EMBODIMENTS OF THE INVENTION

The embodiments of the present invention will be further described in detail below with reference to the accompanying drawings, in order to make the object, technical scheme and advantages of the present invention more clear.

The First Embodiment

Figure 1:
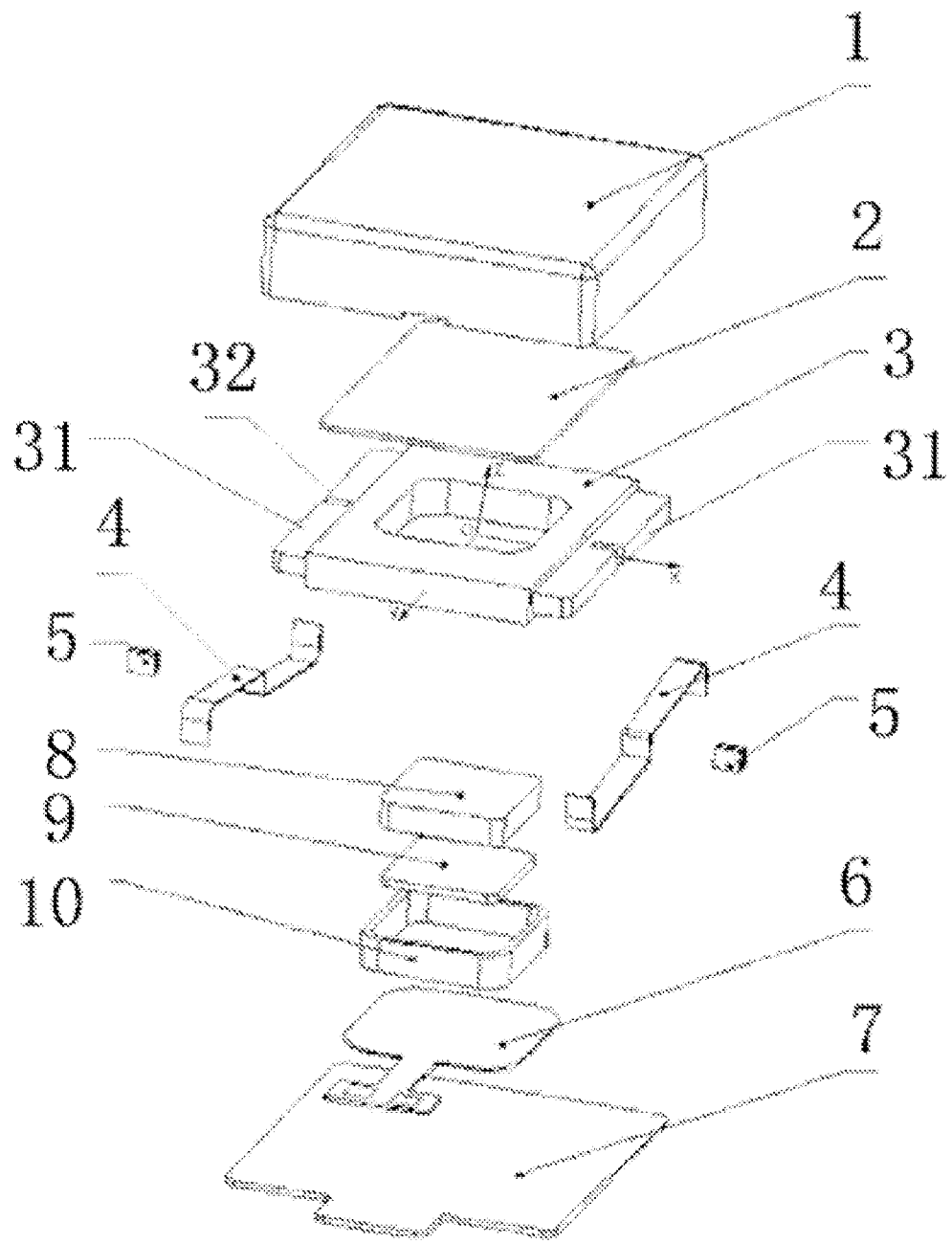
FIG. 1 is an exploded diagram of a linear vibration motor according to the first embodiment of the present invention.

As shown in FIG. 1, an embodiment of the present invention provides a linear vibration motor comprising housing, a mass block 3, elastic pieces 4, a basin frame 2, an FPCB 6, a magnet, a washer, and a coil, wherein the housing comprises an upper shell 1 and a lower shell 7. The elastic pieces 4 connect the mass block 3 and the housing, and the elastic pieces 4 have at least two elastic pieces which are arranged on symmetrical two sides of the mass block 3 respectively to provide an elastic force in Z axis direction, and the mass block performs a movement up and down in the Z axis direction. The X, Y, and Z axis directions are shown in the coordinate system of FIG. 1, wherein the intersection point O of the X, Y, and Z axes is located at the center of the mass block (i.e., the geometric center of the mass block 3), and the Z axis is perpendicular to the upper surface of the mass block, and the X axis passes through the center of the elastic piece 4 (i.e., the geometric center of the elastic piece 4, for example, refer to FIG. 7, the center position of the connecting piece 43 of the elastic piece). A side of the mass block 3 is provided with a support plate 31, and a center portion of the support plate 31 is provided with a notch 32 penetrating the support plate 31 in the vertical direction. The elastic pieces 4 are provided with two vibration arms 42 of the upper vibration arm and the lower vibration arm, and the two vibration arms 42 are symmetrical about the X axis when rotating 180 degrees around the X axis (the X axis direction is as shown by the coordinate system in FIG. 1). The middle portion of the elastic pieces 4 is fixed in the notch 32, and the two vibration arms 42 of the elastic piece 4 are respectively located on the upper side and the lower side of the support plate 31. The elastic piece 4 is made of a single material or a composite material, or the material in which a composite layer is added at later stage of the processing.

Figure 3:
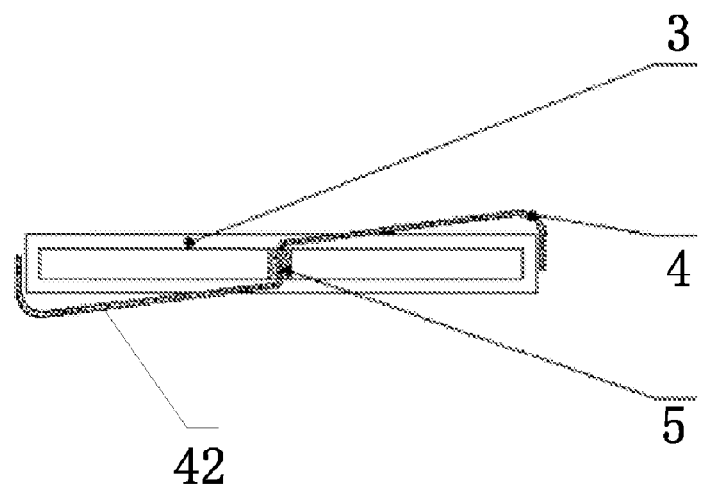
FIG. 3 is a side diagram of FIG. 2.
Figure 4:
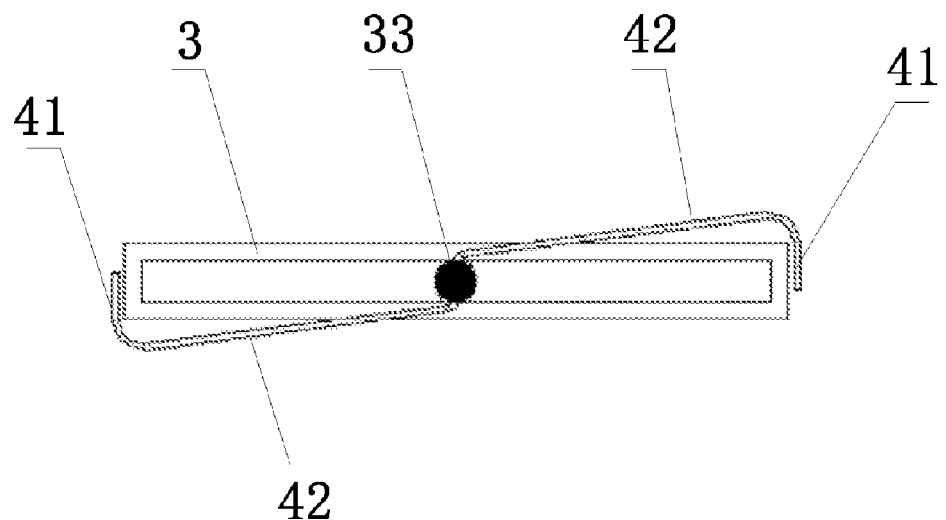
FIG. 4 is a schematic diagram showing welding of a elastic piece and a mass block according to the first embodiment of the present invention.

The linear vibration motor further comprise a stopper 5, and the stopper 5 is embedded in the notch 32, and the middle portion of the elastic piece 4 and the stopper 5 are welded and fixed into the notch 32, and the welding spot 33 is located in the notch 32 (as shown in FIG. 3 and FIG. 4). This type of welding and fixing manner by the middle portion of the elastic pieces 4 can greatly simplify the process, which is advantageous for reducing the cost and ensuring the yield.

Figure 2:
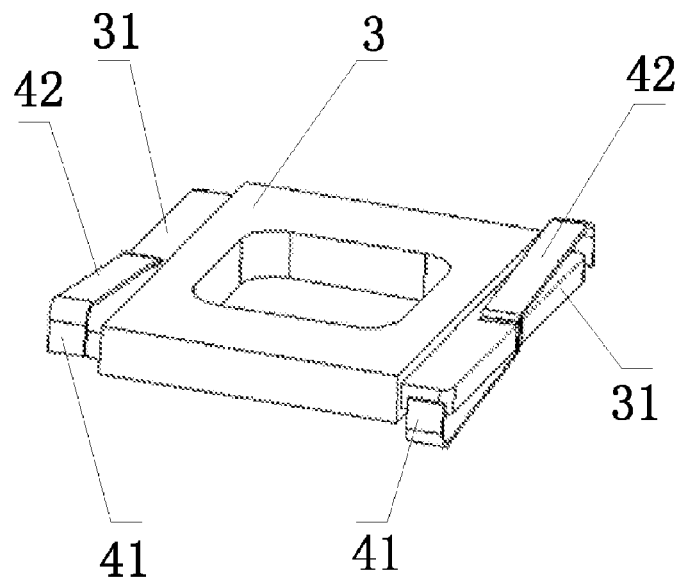
FIG. 2 is an assembly diagram of a elastic piece and a mass block according to the first embodiment of the present invention.

In the embodiment of the present invention, as shown in FIG. 2 and FIG. 3 together, the elastic piece 4 is S-shaped elastic piece 4, the length of the S-shaped elastic piece 4 is greater than the length of the support plate 31, and the S-shaped elastic piece 4 is provided with two vibration arms 42, and the two vibration arms 42 are symmetrical about the X axis when rotating 180 degrees around the X axis. The middle portion of the S-shaped elastic piece 4 is welded and fixed in the notch 32 of the support plate 31, and the two vibration arms 42 are respectively located on the upper side and lower side of the support plate 31. The free ends of the two vibration arms 42 are provided with welding planes 41, and the welding planes 41 are parallel to the plane in the height direction of the support plate 31. The elastic pieces 4 are fixed in the housing by welding each of the welding planes 41.

In the embodiment of the present invention, as shown in FIG. 2, the support plates 31 comprise two support plates, and the two support plates are disposed on symmetrical two sides of the mass block 3 respectively, and the elastic pieces 4 comprise two elastic pieces correspondingly, and the elastic pieces 4 disposed on symmetrical two sides of the mass block 3 are symmetrical about the Z axis when rotating 180 degrees around the Z axis, so as to ensure the balance of the vibration of the mass block 3. Of course, the support plates 31 can also comprise four support plates, and the four support plates are respectively disposed on four sides of the mass block 3, and the elastic pieces 4 comprise four elastic pieces correspondingly, and the elastic pieces 4 disposed on symmetrical two sides of the mass block 3 are symmetrical about the Z axis when rotating 180 degrees around the Z axis, so as to ensure the balance of the vibration of the mass block 3. With the structure of the elastic pieces 4 in which two vibration arms 42 are symmetrical about the X axis when rotating 180 degrees around the X axis and the arrangement that the elastic pieces 4 are symmetrically distributed on symmetric two sides or four sides of the mass block 3, the difference between the first order vibration frequency and the second order vibration frequency of the vibration system can be effectively increased, thereby effectively preventing the generation of polarization.

The Second Embodiment

Figure 5:
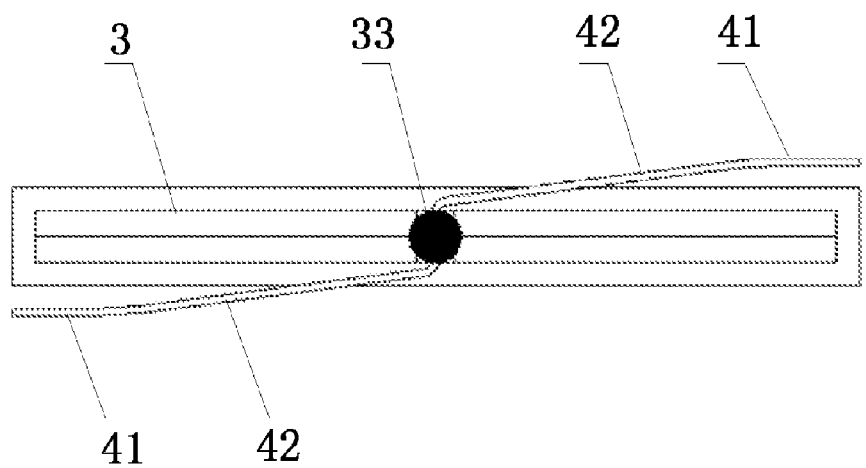
FIG. 5 is a schematic view showing welding of a elastic piece and a mass block according to the second embodiment of the present invention.

In the embodiment of the present invention, as shown in FIG. 5, the elastic pieces 4 are an anti-Z-shaped elastic piece 4, and the length of the elastic pieces 4 is not greater than the length of the support plate 31. The anti-Z-shaped elastic pieces 4 are provided with two vibration arms 42, and the two vibration arms 42 are symmetrical about the X axis when rotating 180 degrees around the X axis. The middle portion of the anti-Z-shaped elastic pieces 4 is welded and fixed in the notch 32 of the support plate 31, and the two vibration arms 42 are respectively located on the upper side and the lower side of the support plate 31. The free ends of the two vibration arms 42 are provided with welding planes 41, and the welding planes 41 are parallel to the plane in the longitudinal direction of the support plate 31. The two vibration arms 42 are fixed in the housing by welding each of the welding planes 41.

In the embodiment of the present invention, the support plates 31 comprise two support plates, and the two support plates are disposed on symmetrical two sides of the mass block 3 respectively, and the elastic pieces 4 comprises two elastic pieces correspondingly, and the elastic pieces 4 disposed on symmetrical two sides of the mass block 3 are symmetrical about the Z axis when rotating 180 degrees around the Z axis, so as to ensure the balance of the vibration of the mass block 3. Of course, the support plates 31 can also comprise four support plates, and the four support plates are respectively disposed on four sides of the mass block 3, and the elastic pieces 4 comprise four elastic pieces correspondingly, and the elastic pieces 4 disposed on symmetrical two sides of the mass block 3 are symmetrical about the Z axis when rotating 180 degrees around the Z axis, so as to ensure the balance of the vibration of the mass block 3. With the structure of the elastic pieces 4 in which two vibration arms 42 are symmetrical about the X axis when rotating 180 degrees around the X axis and the arrangement that the elastic pieces 4 are symmetrically distributed on symmetric two sides or four sides of the mass block 3, the difference between the first order vibration frequency and the second order vibration frequency of the vibration system can be effectively increased, thereby effectively preventing the generation of polarization.

The Third Embodiment

Figure 6:
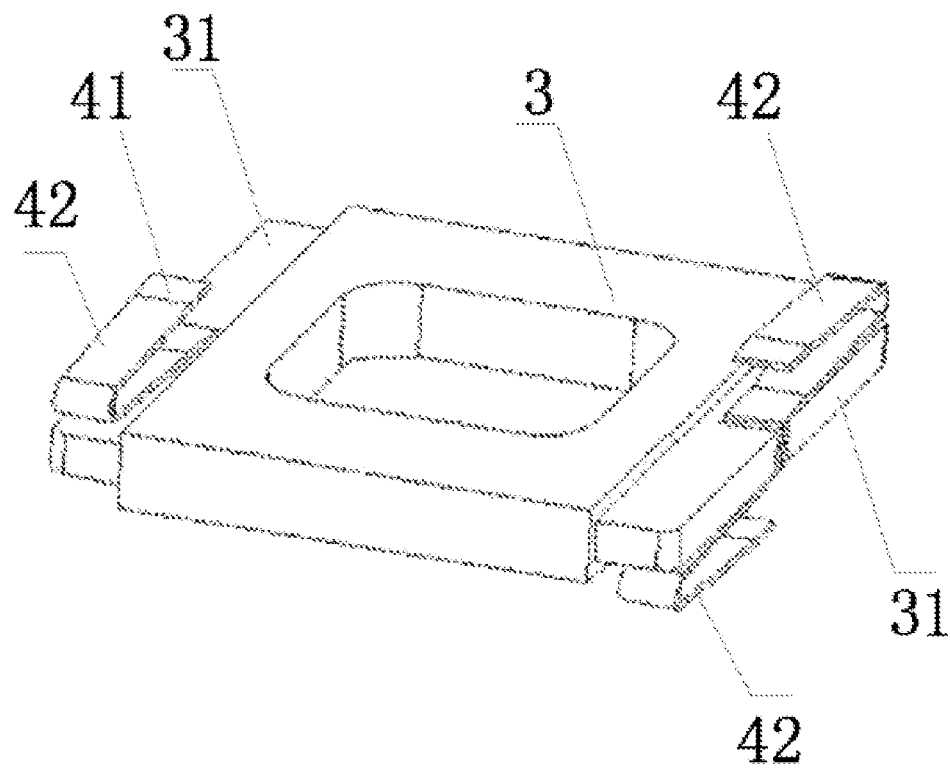
FIG. 6 is an assembly view of a elastic piece and a mass block according to the third embodiment of the present invention.
Figure 7:
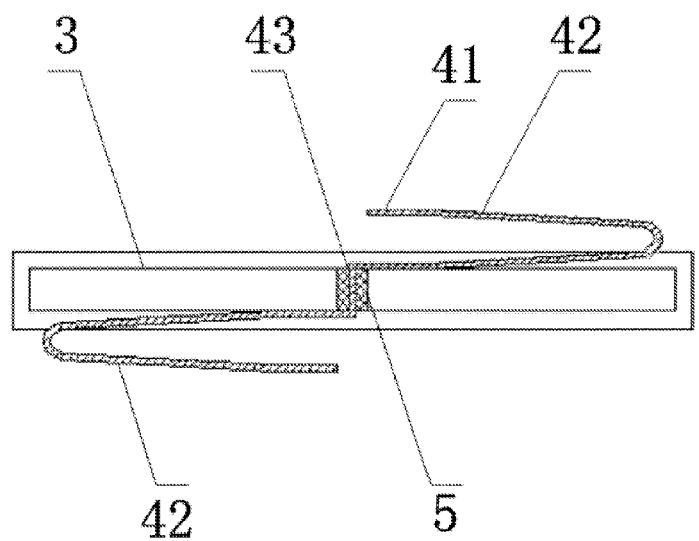
FIG. 7 is a side view of FIG. 6.

In the embodiment of the present invention, as shown in FIG. 6 and FIG. 7 together, the elastic piece 4 is composed of two V-shaped vibration arms 42 and one connecting piece 43, the V-shaped vibration arm 42 are integrally formed with the connecting piece 43, and the length of the V-shaped vibration arm 42 is not greater than ½ of the length of the support plate 31. The two V-shaped vibration arms 42 are symmetrical about the Z axis when rotating 180 degrees around the Z axis, and the openings of the two V-shaped vibration arms 42 are opposite to each other. The connecting piece 43 of the elastic piece 4 is fixed in the notch 32, and the two V-shaped vibration arms 42 are respectively located on the upper side and the lower side of the support plate 31. The free ends of the two V-shaped vibration arms 42 are provided with welding planes 41, and the two V-shaped vibration arms 42 are respectively fixed in the housing by welding the welding planes 41.

In the embodiment of the present invention, as shown in FIG. 6, the support plates comprise two support plates, and the two support plates are disposed on symmetrical two sides of the mass block 3 respectively, and the elastic pieces 4 comprises two elastic pieces correspondingly, and the elastic pieces 4 disposed on symmetrical two sides of the mass block 3 are symmetrical about the Z axis when rotating 180 degrees around the Z axis, so as to ensure the balance of the vibration of the mass block 3. Of course, the support plates 31 can also comprise four support plates, and the four support plates are respectively disposed on four sides of the mass block 3, and the elastic pieces 4 comprise four elastic pieces correspondingly, and the elastic pieces 4 disposed on symmetrical two sides of the mass block 3 are symmetrical about the Z axis when rotating 180 degrees around the Z axis, so as to ensure the balance of the vibration of the mass block 3. With the structure of the elastic pieces 4 in which two vibration arms 42 are symmetrical about the X axis when rotating 180 degrees around the X axis and the arrangement that the elastic pieces 4 are symmetrically distributed on symmetric two sides or four sides of the mass block 3, the difference between the first order vibration frequency and the second order vibration frequency of the vibration system can be effectively increased, thereby effectively preventing the generation of polarization.

The above are only the preferred embodiments of the present invention and are not intended to limit the scope of the present invention. Any modifications, equivalent substitutions, improvements, etc. made within the spirit and scope of the present invention are included in the scope of the present invention.

The invention claimed is:

1. A linear vibration motor comprising a housing, a mass block, and elastic pieces connecting the mass block and the housing, wherein the elastic pieces have at least two elastic pieces which are respectively arranged on two symmetric sides of the mass block, the elastic pieces provide an elastic force in a Z axis direction, and the mass block moves up and down in the Z axis direction; and
   wherein each side of the mass block is provided with a respective support plate, and a central portion of each of the support plate is provided with a notch penetrating through the support plate in an up-down direction; and
   wherein each of the elastic pieces is provided with two vibration arms, an upper vibration arm and a lower vibration arm, the two vibration arms are 180 degrees symmetrical about a X axis, middle portions of the elastic pieces are fixed in the notch, and the two vibration arms of the elastic pieces are respectively located on an upper side and a lower side of the support plates.

2. The linear vibration motor of claim 1, wherein the linear vibration motor further comprises a stopper which is locked into the notch, and middle portions of the elastic pieces and the stopper are welded and fixed in the notch.

3. The linear vibration motor of claim 2, wherein the support plate(s) comprise two support plates, and the two support plates are disposed on two symmetrical sides of the mass block respectively, and the elastic pieces comprise two elastic pieces corresponding to the support plates; or
   the support plate(s) comprise four support plates, and the four support plates are arranged on four sides of the mass block respectively, and the elastic pieces comprise four elastic pieces corresponding to the support plates; and the elastic pieces disposed on two symmetrical sides of the mass block are 180 degrees symmetrical about the Z axis.

4. The linear vibration motor according to claim 3, wherein the elastic pieces are S-shaped elastic pieces, the middle portions of the S-shaped elastic pieces are welded and fixed in the notches of the support plates, and each of the S-shaped elastic pieces are provided with the two vibration arms which are respectively located on the upper side and lower side of the support plate; and free ends of the two vibration arms are provided with welding planes, and the two vibration arms are fixed in inner sides of the housing by welding each of the welding planes respectively.

5. The linear vibration motor according to claim 4, wherein lengths of the S-shaped elastic pieces are greater than lengths of the support plates.

6. The linear vibration motor according to claim 3, wherein each of the elastic pieces comprises two V-shaped vibration arms and one connecting piece, and the V-shaped vibration arms are integrally formed with the connecting piece; the two V-shaped vibration arms are 180 degrees symmetrical about the X axis, and openings of the two V-shaped vibration arms are opposite to each other;

the connecting piece is fixed in the notch, and the two V-shaped vibration arms are respectively located on the upper side and the lower side of the support plates; and free ends of the two V-shaped vibration arms are provided with welding planes, and the two V-shaped vibration arms are fixed in inner sides of the housing by welding each of the welding planes respectively.

7. The linear vibration motor according to claim 6, wherein lengths of the V-shaped vibration arms are no more than ½ of lengths of the support plates.

8. The linear vibration motor according to claim 3, wherein the elastic pieces are anti-Z-shaped elastic pieces;

the middle portions of the anti-Z-shaped elastic pieces are welded and fixed in the notches of the support plates, and the anti-Z-shaped elastic pieces are provided with the two vibration arms which are respectively located on the upper side and lower side of the support plate; and free ends of the two vibration arms are provided with welding planes, and the two vibration arms are fixed in inner sides of the housing by welding each of the welding planes respectively.

9. The linear vibration motor according to claim 8, wherein lengths of the anti-Z-shaped elastic pieces are no more than lengths of the support plates.

10. The linear vibration motor of claim 1, wherein the elastic pieces are made of a single material or a composite material, or a material in which a composite layer is added at later stage of processing.

* * * * *